United States Patent
Suzuki et al.

(10) Patent No.: US 6,612,710 B2
(45) Date of Patent: Sep. 2, 2003

(54) SURFACE LIGHT SOURCE DEVICE, DISPLAY AND LIGHT GUIDE PLATE

(75) Inventors: Kazuo Suzuki, Saitama (JP); Kazumasa Ohsumi, Hatogaya (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 10/060,214

(22) Filed: Feb. 1, 2002

(65) Prior Publication Data

US 2003/0007342 A1 Jan. 9, 2003

(30) Foreign Application Priority Data

Feb. 6, 2001 (JP) ........................................ 2001-028998

(51) Int. Cl.[7] ................................................ F21V 8/00
(52) U.S. Cl. ......................... 362/31; 362/246; 362/333; 362/355
(58) Field of Search .......................... 362/31, 246, 333, 362/559, 561, 26

(56) References Cited

U.S. PATENT DOCUMENTS

| | | | | |
|---|---|---|---|---|
| 3,832,541 A | * | 8/1974 | Bassett et al. | 362/333 |
| 5,363,294 A | * | 11/1994 | Yamamoto et al. | 362/330 |
| 5,857,761 A | * | 1/1999 | Abe et al. | 362/551 |
| 6,347,873 B1 | * | 2/2002 | Hosseini et al. | 362/31 |
| 6,435,686 B1 | * | 8/2002 | Gotou et al. | 362/31 |

FOREIGN PATENT DOCUMENTS

| | | | | |
|---|---|---|---|---|
| JP | 403009304 A | * | 1/1991 | |
| JP | 04355429 A | * | 12/1992 | |
| JP | 05232467 A | * | 9/1993 | |
| JP | 06082632 A | * | 3/1994 | |

* cited by examiner

Primary Examiner—Sandra O'Shea
Assistant Examiner—Hargobind S. Sawhney
(74) Attorney, Agent, or Firm—Staas & Halsey LLP (57) ABSTRACT

A light guide plate has a back face provided with a first light diffusion pattern which tends to get denser according to an increasing distance from a primary light source. The light guide plate has an emission face provided with a second light diffusion pattern covering rate of is the largest at an approximately center portion (particular partial region) of the emission face. The first and second light diffusion patterns consist of a great number of fine light diffusion elements, respectively. Each fine light diffusion element of the second light diffusion pattern has a smaller size as compared with that of the first light diffusion pattern. The emission face of the light guide plate has an effective emission area to provide an emission light which is supplied to an LCD panel or other objects to be illuminated, via a light control member such as prism sheet. The approximately center portion and/or other one or more particular partial regions in the emission face show an intentionally heightened brightness. This enables an image display unit to have an approximately center portion and/or other one or more particular partial regions which display a brightness-emphasized image. Such an emphasis display technique is suitably applied to devices such as digital still cameras or digital video cameras which employ image-screen-center-portion focusing.

27 Claims, 8 Drawing Sheets

SURFACE LIGHT SOURCE DEVICE, DISPLAY AND LIGHT GUIDE PLATE

BACKGROUND

1. Field of Invention

The present invention relates to a surface light source device generating a light flux illuminating an image display unit, such as LCD panel, of a display and to a display, such as LCD, which employs the surface light source device. The present invention also relates to a light guide plate which is employed in the surface light source device or display.

2. Related Art

It has been well known that a display for digital still cameras, digital video cameras, portable telephones, electronic pocket notebooks, car navigation devices, portable personal computers or liquid crystal television sets comprises an image display unit, such as LCD panel, illuminated by a surface light source device.

In general, a surface light source device comprises a primary light source such as fluorescent lamp or LED and a light guide plate having a side face (incidence face) through which the light guide plate is supplied with light of the primary light source. The light supplied by the primary light source is introduced into the light guide plate, propagating in the light guide plate. As known well, the emission face emits light on the way of this propagating. The emitted light is supplied to an image display unit such as LCD panel directly or via an additional member such as light diffusion plate or prism sheet.

In surface light source devices of such type, all surface of light guide plate except the incidence face and emission face usually faces any reflection member, thereby causing much of light leaking from faces other than the emission face to return into the light guide plate without being loss. The light returned gets a chance of emitting from the emission face.

Any technique is required for causing an emission face of a light guide plate in such a surface light source device of such type to provide a uniform emission. If no technique in particular applied, in general, a highly bright region appears impartially on the emission face in the vicinity of an end portion near to a primary light source. Further to this, brightness tends to decrease according to an increasing distance from the primary light source. If such uneven brightness is not reduced, the image display unit illuminated by the surface light source device provides an uneven image brightness, leading to undesirable visual effects.

For avoiding this, a prior art such as disclosed in Japanese Patent Laid-open (Tokkai-Hei) 1-241590 is employed. According to the prior art, a light diffusion pattern is formed on a back face (rear face) opposite with an emission face (front face) so that light diffusion ratio gets larger according to an increasing distance from a primary light source. This promotes emission from an area which is apt to show a reduced brightness well relatively, leading to a uniformalized emission intensity.

In recent years, however, such uniform brightness over an emission face does not always give the best condition. That is, some sorts of displays are often required to show a higher brightness in an area approximately at a center portion or other particular areas of an image display screen as compared with brightness around an end portion, under recent situation such that digital technology is broadly applied to displays and various image display manners are growingly employed.

For example, the above way is able to be applied really to a display such as digital still camera or digital video camera employing image-screen-center-portion focusing, the higher-brightness area can provide an emphasized image which is easier to see as compared with that provided in cases where a display unit is irradiated by an illumination light of an uniform brightness. Therefore, there arises demand for technique for giving a relatively high brightness to an approximately center portion or other particular portion(s) of an emission face of a light guide plate.

SUMMARY AND OBJECT OF INVENTION

The the present invention has been proposed to give answer to such demand, being applied in the first place to a surface light source device comprising a light guide plate, having a major face to provide an emission face and another major face to provide a back face opposite with said the emission face, and a primary light source disposed in the vicinity of an end portion of said light guide plate, said primary light source supplying light to be introduced into said light guide plate and then to be emitted from said emission face.

According to a feature of the present invention, a first light diffusion pattern is formed on said back face, said first light diffusion pattern consisting of light diffusion elements distributed as to tend to get denser according to an increasing distance from said primary light source, and a particular partial region and surrounding region around the particular partial region is defined in said emission face, and a second light diffusion pattern is formed in said particular partial region so that said particular partial region provides a higher emission brightness as compared with that provided by a vicinity around said particular partial region.

This feature enables emission from the particular partial region to have a relatively high brightness. As a result, the foresaid demand is satisfied.

Typically, said particular partial region is located approximately at a center of said emission face. In this case, a high-brightness emission region is provided at an approximately center portion of the emission face in correspondence to the particular partial region.

The second light diffusion pattern may be also formed at least in a part of said surrounding region. The second light diffusion pattern may consist of light diffusion elements which are distributed more densely in said particular partial region as compared with in the surrounding region.

The second light diffusion pattern may consist of light diffusion elements each of which is smaller than each of light diffusion elements of which the first light diffusion pattern consists, the light guide plate may have a wedge-like cross section so that thickness gets smaller according to an increasing distance from said primary light source.

In the next place, the present invention is applied to a display comprising a surface light source device and an image display unit supplied with illumination light from a surface light source device. The display in accordance with the present invention adopts the above-featured surface light source device as a surface light source device for supplying illumination light to the image display unit.

In other words, the surface light source device includes a light guide plate, having a major face to provide an emission face and another major face to provide a back face opposite with said the emission face, and a primary light source disposed in the vicinity of an end portion of said light guide plate, said primary light source supplying light to be introduced into said light guide plate and then to be emitted from said emission face.

And a first light diffusion pattern is formed on said back face of the light guide plate, said first light diffusion pattern consisting of light diffusion elements distributed as to tend to get denser according to an increasing distance from said primary light source, and a particular partial region and surrounding region is defined in said emission face, and a second light diffusion pattern is formed in said particular partial region so that said particular partial region provides a higher emission brightness as compared with that provided by the region around said particular partial region.

This feature enables the image display unit to have a high-brightness displaying region in correspondence to said particular partial region.

Typically, said particular partial region is located approximately at a center of said emission face. In this case, a high-brightness image displaying region is provided in correspondence to the approximately center portion of the emission face.

A third light diffusion pattern may be formed at least in a part of said surrounding region. It is noted that no light diffusion pattern may be formed in said surrounding region.

The second light diffusion pattern may be also formed at least in a part of said surrounding region. The second light diffusion pattern may consist of light diffusion elements which are distributed more densely in said particular partial region as compared with in the surrounding region.

The second light diffusion pattern may consist of light diffusion elements each of which is smaller than each of light diffusion elements of which the first light diffusion pattern consists, the light guide plate may have a wedge-like cross section so that thickness gets smaller according to an increasing distance from said primary light source.

The present invention is further applied to a light guide plate having a major face to provide an emission face, another major face to provide a back face opposite with said the emission face and an incidence face through which light is introduced to be emitted from said emission face.

According to a feature of the present invention, a first light diffusion pattern is formed on said back face, said first light diffusion pattern consisting of light diffusion elements distributed as to tend to get denser according to an increasing distance from said primary light source, and a particular partial region and surrounding region, around the particular partial region, is defined in said emission face, and a second light diffusion pattern is formed in said particular partial region so that said particular partial region provides a higher emission brightness as compared with that provided by the region around said particular partial region.

This feature enables to the light guide plate to provide a high-brightness region in correspondence to said particular partial region when light is inputted on into the light guide plate.

Typically, said particular partial region is located approximately at a center of said emission face. In this case, a high-brightness emission region is provided in correspondence to the approximately center portion.

The second light diffusion pattern may be also formed at least in a part of said ordinary region. The second light diffusion pattern may consist of light diffusion elements which are distributed more densely in said particular partial region as compared with in the ordinary region.

The second light diffusion pattern may consist of light diffusion elements each of which is smaller than each of light diffusion elements of which the first light diffusion pattern consists, the light guide plate may have a wedge-like cross section so that thickness gets smaller according to an increasing distance from said primary light source.

EMBODIMENT

First Embodiment

Figure 1:
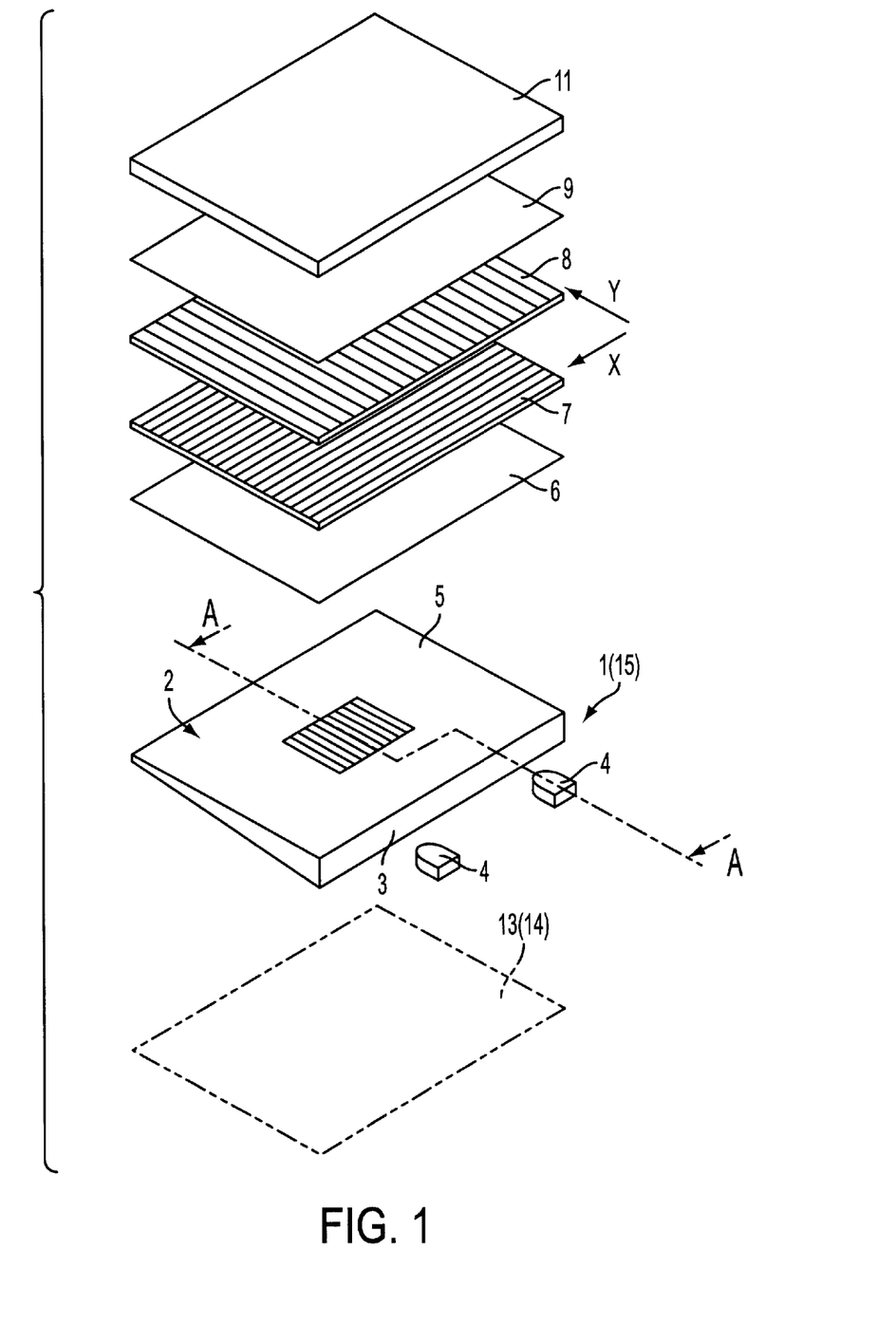
FIG. 1 is an exploded perspective view of a LCD of a first embodiment in accordance with the present invention.
Figure 2:
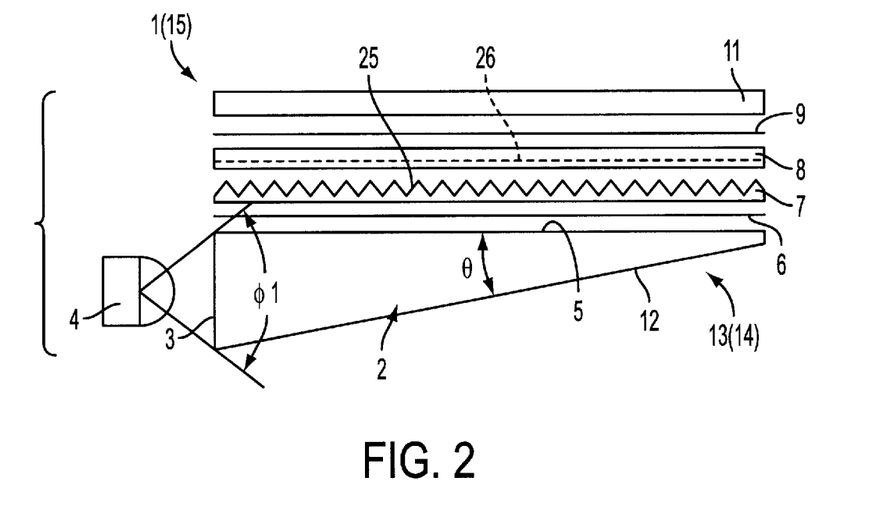
FIG. 2 is a cross section of the LCD along line A—A in FIG. 1.

FIGS. 1 and 2 illustrate a display of the first embodiment in accordance with the present invention. The display is a liquid crystal display 1 a perspective view of which is shown in FIG. 1. FIG. 2 is a cross section along line A—A in FIG. 1.

<Outlined Structure of Display and Surface Light Source Device>

Referring to FIGS. 1 and 2, the LCD 1 comprises a light guide plate 2, light emitting diode 4 as primary light source, first through forth light control member 6 to 9 and liquid crystal display panel 11 as image display unit.

The LED 4 is disposed near to an incidence face 3 of the light guide plate 2 and the light control members 6 to 9 are piled and arranged along an emission face 5 of the light guide plate 2. The LCD panel 11 is disposed outside of the forth light control member 9.

Further, a member having a superior reflectivity (such as reflection sheet 13 or reflection face 14 of a casing) is arranged along a back face 12 (opposite with the emission face 5) of the light guide plate 2.

Thus the LCD panel 11 is back-lightened by a surface light source device 15 composed of the light guide plate 2, LED 4, first through forth light control members 6 to 9 and reflective members (13, 14). The display 1 is accommodated in an LCD-accommodation-portion of a casing not shown.

In the next place, details of the surface light source device 15 is described.

Light Emitting Diode

Figure 3:
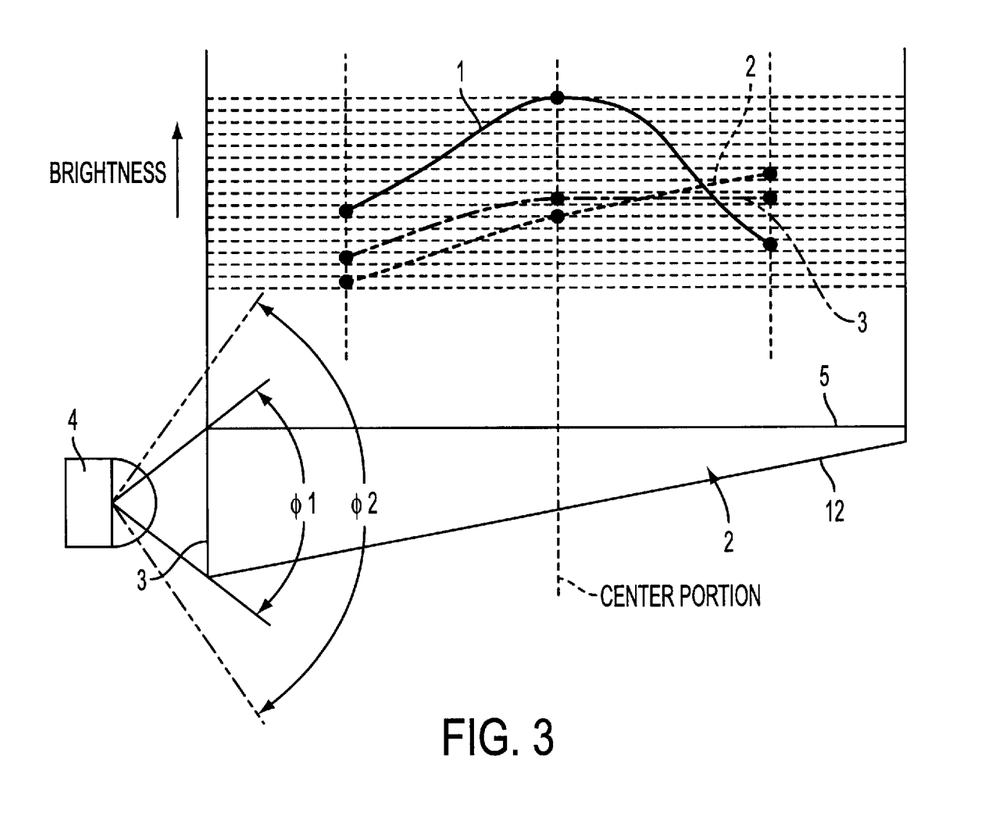
FIG. 3 is a diagram illustrating emission brightness characteristics of light guide plates of the first embodiment in accordance with the present invention and of first and second references, respectively.

The LED 4 has an angular-emission-half-width $\phi$ 1 (i.e. angular range within which emission brightness is not less than half the maximum emission brightness) in a direction of thickness of the light guide plate 2 is about 60 degrees as shown in FIG. 3. It is noted that usual LEDs have has an angular-emission-half-width $\phi$ 2 in a direction of thickness of the light guide plate 2 is about 120 degrees. In other words, the LED employed in the instant embodiment has a moderate directivity regarding in a direction of thickness of the light guide plate 2.

Light Guide Plate

The light guide plate 2 is formed of resin having a superior light transmissivity (such as polymethyl methacrylate (PMMA), polycarbonate(PC), cycloolefin-type resin), hiving a wedge-like cross section such that thickness gets smaller according to an increasing distance from the LED 4 (from the left to the right in FIG. 2).

The emission face 5 is shaped like a rectangular in correspondence to the shape of the LCD panel 11, being generally the same as the LCD panel in size. Angle $\theta$ in FIG. 2 indicates "wedge-angle" of the light guide plate 2, being about 4 degrees ($\theta$=about 4 degrees) in the instant embodiment. This value is larger than wedge-angles of usual light guide plates (smaller than 2 degrees) which are employed in LCDs having screen sizes generally equal to screen size of the LCD of the instant embodiment.

Figure 4A:
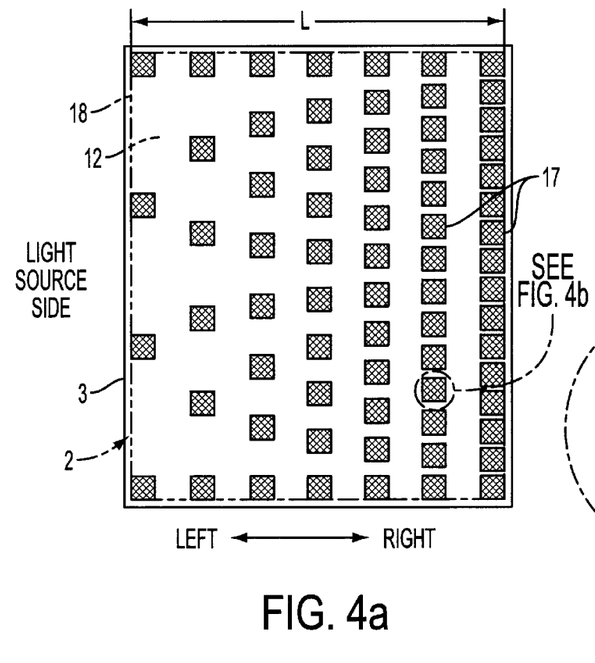
FIG. 4a illustrates a back face of a light guide plate employed in the first embodiment and FIG. 4b is an partially enlarged illustration of the back face.

A light diffusion pattern (first light diffusion pattern) 17 is formed on the back face 12 of the light guide plate 2 as to tend to get denser (from the left to the right in FIG. 4a), as shown in FIG. 4a, according to an increasing distance from the primary light source (LED 4). Variation of covering rate of the first light diffusion pattern 17 is illustrated as covering rate curve ① in FIG. 5.

It is noted that abscissa indicates ratio of distance from the end, near to the incidence face, of an effective emission area 18 in the emission face 5 of the light guide plate 2 with respect to the total length of the effective emission area 18 L (See FIG. 6). Scale numerals are indicated every L/7. in FIG. 5, ordinate indicates covering rate. It is noted that covering rate is defined as rate of formation (or rate of occupation) of light diffusion pattern per unit area.

The light diffusion pattern 17 formed as above causes the back face 12 to diffuse at a small rate on the side of the LED 4 (left side in FIG. 4a) and to show a growingly large rate according to an increasing distance from the LED 4. Therefore, degree of promotion of emission from the emission face 5 gets greater according to an increasing distance from the side of the LED 4.

Since density variation of light diffusion pattern is only required to tend to get greater as a whole according to an increasing distance from the light source, there may be a local part where density varies from being large to being small.

Figure 4B:
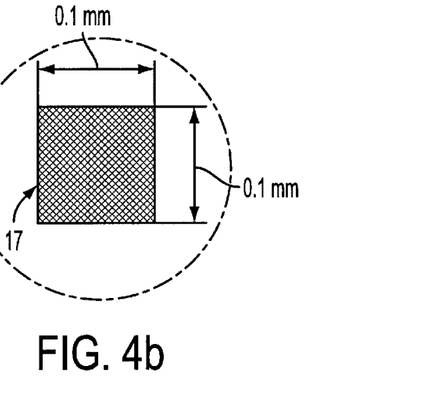

The first light diffusion pattern 17 consists of a great number of fine light diffusion elements. Each light diffusion element is shaped like a square of 0.1 mm in size as shown in FIG. 4b. It is noted that reference numeral 17 is used for denoting one light diffusion element.

The light diffusion elements are produced, when injection-molding is carried out, by transfer of a coarse area to the back face of the light guide plate 12, wherein the coarse area is formed on a mold for injection molding of the light guide plate 2 through etch-processing, discharge machining, blast-processing or other roughening processes.

Referring to FIG. 6, the emission face 5 of the light guide plate 2 is shown. The emission face 5 has an effective emission area 18 shaped like a rectangle as indicated by two-dot chain line. The LCD panel 11 is supplied with illumination light emitted from the effective emission area 18. A light diffusion pattern (second light diffusion pattern) 19 is formed in the effective emission area 18 so that covering rate is the largest at an approximately center portion (a typical example of particular partial region) as indicated by covering rate curve ② in FIG. 5.

The second light diffusion pattern 19 consists of a great number of fine light diffusion elements. The light diffusion pattern (the second light diffusion pattern) 19 is formed also in the rest region (ordinary region) other than the particular partial region (approximately center portion, in the instant embodiment). It should be noted, however, that the light diffusion pattern 19 is formed at a reduced density around the particular partial region (approximately center portion, in the instant embodiment) as compared with the particular partial region.

Figures 6A, 6B:
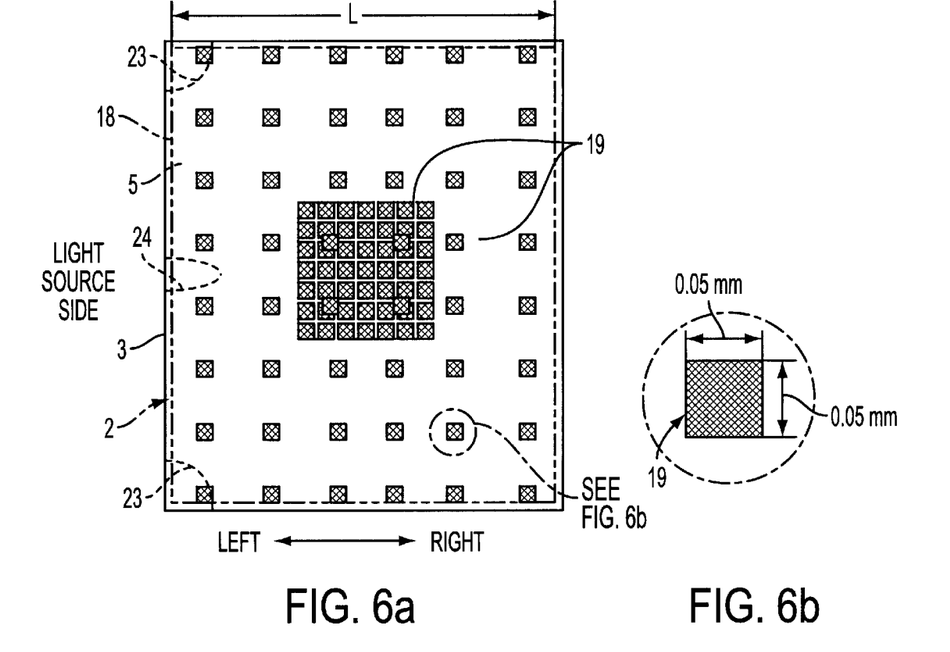
FIG. 6a is a plan view illustrating an emission face of the light guide plate employed in the first embodiment and FIG. 6b is an partially enlarged illustration of the back face.

Each light diffusion element of the second light diffusion pattern 19 is shaped like a square of 0.05 mm in size as shown in FIG. 6b. In other words, it is smaller than each light diffusion element of the first light diffusion pattern 17. It is noted that reference numeral 19 is used for denoting one light diffusion element.

In the next place, effects and advantages of the light guide plate 2 employed in the instant embodiment are described in comparison with some reference examples. First, referring to FIGS. 7 to 9, relative emission brightness distributions of light guide plates 2 of the instant embodiment and of references are shown in average scores for individual area sections.

Figure 7:
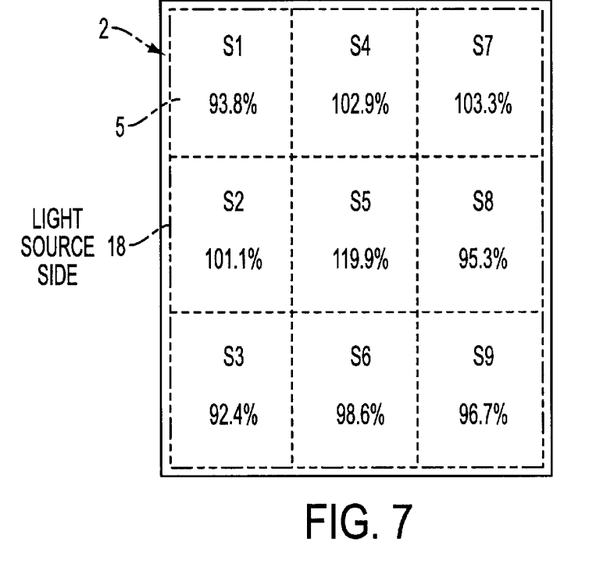
FIG. 7 illustrates an emission brightness distribution obtained in the first embodiment in accordance with the present invention.
Figure 8:
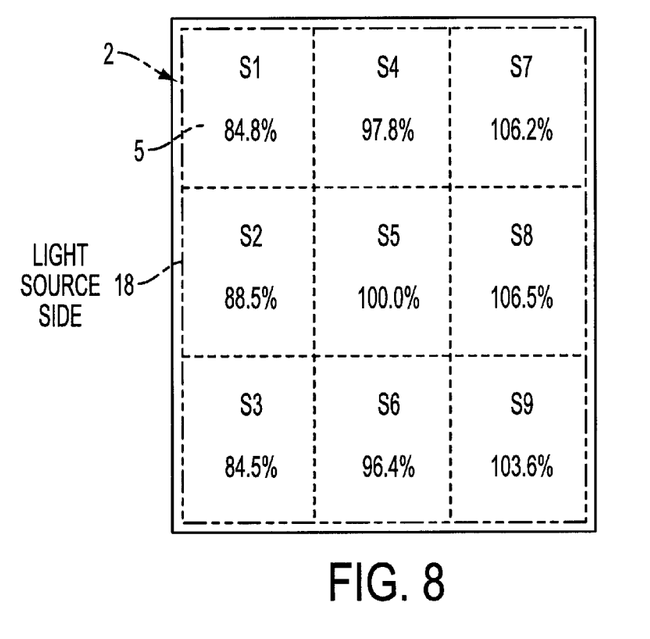
FIG. 8 illustrates an emission brightness distribution obtained in a case where a light guide plate of the first reference is employed.

FIG. 7 illustrates a relative emission brightness obtained in the instant embodiment and FIG. 8 illustrates a relative emission brightness obtained in a case where a light guide plate 2 of the first reference is employed.

Figure 9:
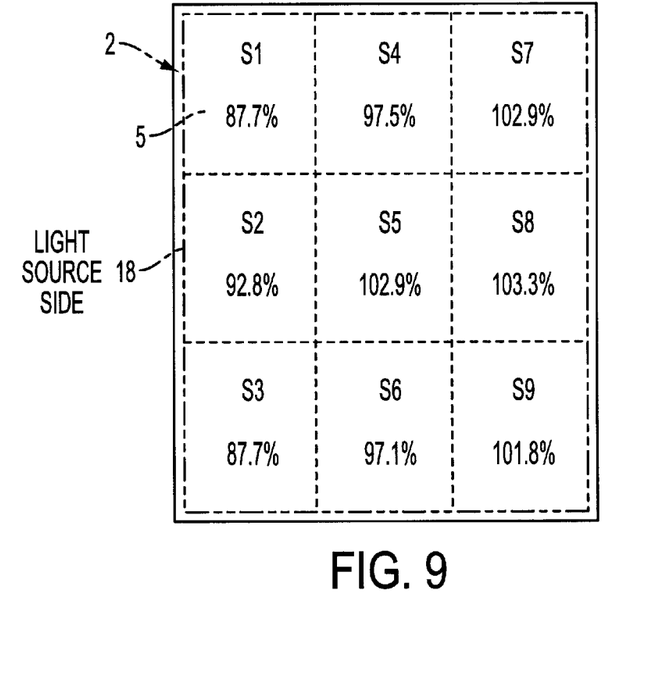
FIG. 9 illustrates an emission brightness distribution obtained in a case where a light guide plate of the second reference is employed.

And FIG. 9 illustrates a relative emission brightness obtained in a case where a light guide plate 2 of the second reference is employed. In each case, an effective emission area is divided equally into S1 through S9 for the sake of convenience, wherein shown is each measured relative value of brightness averaged within each emission face section area (S1 . . . S9).

The measurement was carried out under a condition such that the light control members 6 to 9 are arranged along an emission face 5 (See FIGS. 1 and 2).

Relative emission brightness of the emission face sections S2, S5 and S8 for each case is illustrated graphically for the sake of easy understanding in FIG. 3. Solid line brightness curve ① shows relative emission brightness characteristics of the instant embodiment and dotted line brightness curve ② shows relative emission brightness characteristics of the first reference and two-dotted chain line brightness curve ③ shows relative emission brightness characteristics of the second reference.

Figure 5:
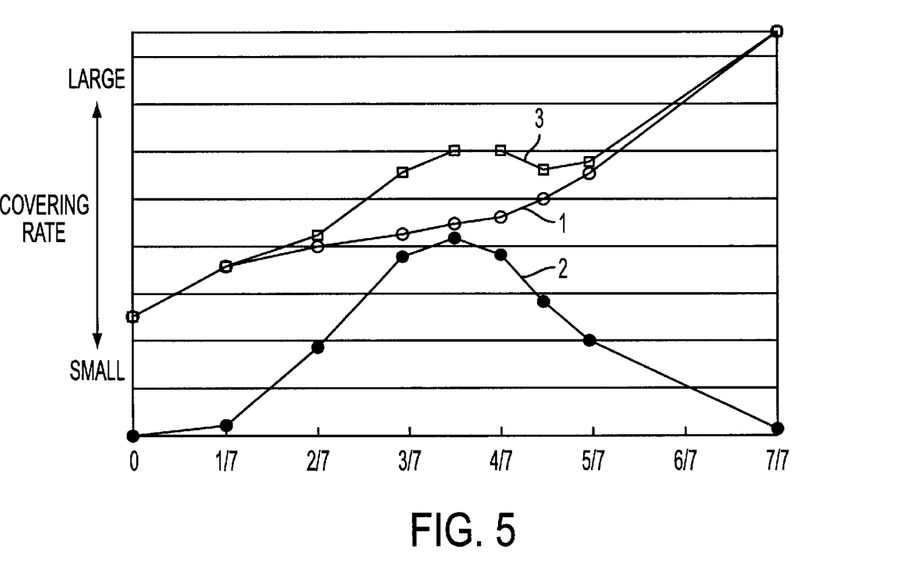
FIG. 5 is a graph illustrating covering rate of light diffusion pattern formed on light guide plates of the first embodiment in accordance with the present invention and of first and second references, respectively.

In FIG. 3, abscissa indicates ratio of distance from the end, near to the incidence face, of an effective emission area 18 in the emission face 5 of the light guide plate 2 with respect to the total length of the effective emission area 18 L in the same manner as in the case of FIG. 5. Scale numerals are indicated every L/7. Ordinate indicates brightness.

It is note that an experiment had a design target, as an example, such that an approximately center portion S5 of the emission face 5 of the light guide plate 2 is to provide a 20%-increased brightness as compared with a total average brightness. For aiming, covering rate of the second light diffusion pattern 19 in the approximately center portion S5 was changed variously for repeating measurements.

As a result of the experiment, it was found that the above design target is realized if the second light diffusion pattern 19 has a covering rate which is about 89% of covering rate of the first light diffusion pattern 17 at an approximately center portion of the back face 12. The brightness curve ① in FIG. 3 and data shown in FIG. 7 were obtained under such condition.

As mentioned above, the first light diffusion pattern 17 and second light diffusion pattern 19 are formed on almost over the emission face 5 and back face 12 of the light guide plate 12 in the instant embodiment. Paying a particular attention to the respective center portions of the emission face 5 and back face, covering rate of the second light diffusion pattern 19 is about 89% of that of the first light diffusion pattern 17 (See covering rate curves ① and ② in FIG. 5).

It is noted average covering rate of light diffusion pattern 17 in the approximately center portion of the back face 12 is about 44% and average covering rate of light diffusion pattern 19 in the approximately center portion of the emission face 5 is about 39% (44%×0.89).

Next, referring to FIG. 8, results of measurement for the first reference are illustrated. The first reference employs a light guide plate which is not provided with the second light diffusion pattern 19 at all.

The other conditions are the same as those of the instant embodiment. That is, the light guide plate in the first reference is provided with the first light diffusion pattern 17 formed only on a back face according to the covering rate curve ① in FIG. 5. This corresponds to a design aiming that emission brightness is distributed as even as possible over the emission face.

Wedge-angle θ of light guide plate of the first reference is about 4 degrees that is the same as that in the case of the light guide plate 2 employed in the instant embodiment, being larger than wedge-angles (about 2 degrees) of conventional and general light guide plates (See FIGS. 2 and 3). An LED used for the first reference is the same as the LED 4 used in the instant embodiment.

That is, angular-emission-half-width φ 1 is 60 degrees, which is smaller than angular-emission-half-width φ 2 equal to about 120 degrees of conventional and general LEDs, and the used LED has a moderate directivity regarding in a direction of thickness of the light guide plate 2.

Figure 10:
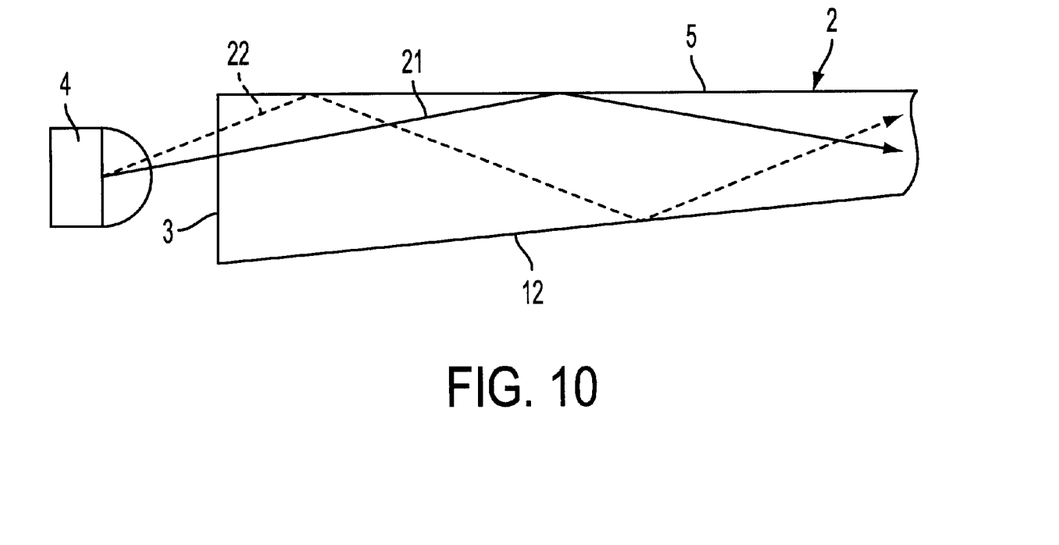
FIG. 10 is a diagram illustrating manners of propagation of light emitted from a LED having a directivity regarding in a plane parallel with thickness direction of a light guide plate and from a usually used LED for comparison, respectively.

Therefore, as illustrated in FIG. 10, emitting light 21 of the LEDs 4 in both the instant embodiment and reference have smaller incidence angles to each incidence face 3 those of emitting light 22 (the same as the light 21 intensity) of conventional LEDs.

As a result, much light reaches with ease to distant parts (S7 to S9). There arises a tendency such that emission brightness increases according to an increasing distance from the LED 4, bringing the emission section areas S7 to S9 the highest scores of emission brightness (See dot-lined brightness curve ②, in FIG. 3, and FIG. 8).

The second reference shown in FIG. 9 employs a light guide plate which corresponds to a modified one of the first reference. That is, the instant light guide plate 12 has a back face 12 in an approximately center (corresponding to the approximately center portion S5 of the emission face 5) of which the first light diffusion pattern 17 is increased by about 33% in average (See covering rate curve ③ in FIG. 5). No second light diffusion pattern 19 was formed on the emission face. Under this condition, the approximately center portion S5 showed an emission brightness which was increased by about 3% as compared with that around the portion S5.

Thus the second reference obtained an increase of 3% in emission bright at the approximately center portion S5 (See dash-lined brightness curve ③ in FIG. 3). According to an empirical rule, an increase in covering rate of a light diffusion pattern formed on the back face 12 is approximately proportional to an increasing rate of emission brightness.

Provided that such empirical rule is appropriate, the first light diffusion pattern 17 with a covering rate increased by about 89% at the approximately center portion of the back face 12 will cause the approximately center portion S5 of the emission face 5 to show an emission brightness increased by only 8% or less. Tis is because 3%×(89/33) is equal to about 8%. In other words, if the first light diffusion pattern 17 is formed solely, the approximately center portion S5 in the emission face 5 is hardly able to show a 20%-increased emission brightness.

On the other hand, the instant embodiment a 20%-increased emission brightness is realized at the approximately center portion S5 by a combination of the first light diffusion pattern 17 formed on the back face 17 and the second light diffusion pattern 19 formed on the emission face 5. This demonstrates clearly that a great advantage is obtained by combining the first and second light diffusion pattern 17 with the second light diffusion pattern 19.

It is noted that the light guide plate 2 employed in the instant embodiment may be modified as follows.

Light emission promoting means may be applied to an area which is apt to be dark (such as end corner areas 23 or an area 24 corresponding to a portion between LEDs). For example, the first light diffusion pattern 17 or the second light diffusion pattern 19 may have an increased covering rate in these areas 23, 24 to prevent the emission face to have a dark area.

When any light diffusion pattern receives light on the way of inside propagation, light diffusion elements composing the light diffusion pattern scatter light. As a result, there arises a difference in brightness between locations any light diffusion element formed and those no light diffusion element formed.

This difference in brightness is a kind of unevenness in brightness, which is observed as so-called "glaring", bringing a reduced shining quality. This phenomenon is apt to occur when a light diffusion pattern is form on an emission face. And the larger the light diffusion elements composing the light diffusion pattern the more conspicuous uneven in brightness is.

ConsideringG this, the instant embodiment the second light diffusion pattern 19 formed on the emission face 5 consist of light diffusion elements size of each of which is smaller than that of each of the light diffusion elements of composing the first light diffusion pattern 17 formed on the back face 12, thereby relaxing feeling of glaring.

Light Control Member

The first through forth light control members 6 to 9 are sheet members made of materials superior in transmissivity (such as polyethylene terephthalate (PET))m, respectively. Size of each of light control members is generally the same as the emission face 5 in shape and size.

The first light control member 6 is a light diffusion sheet having a light diffusion pattern function. The light control member 6 includes a PET sheet as a base material to which a light diffusion function is given by means of, for example, "dispersing light diffusing substance in the inside", "surface-covering of a film of light diffusing substance", "surface-roughening (making uneven)" or the like.

The second light control member 7 is a so-called prism sheet. The light control member 7 includes a PET sheet as a base material having an upper face on which a great number of prism cuts 25 having a cross section shaped like triangles are formed repeatedly. Each of the prism cuts 25 extends approximately in X-direction shown in FIG. 1.

The second light control member 7 has a function of modifying a propagation direction of light regarding in a plane approximately in Y-direction shown in FIG. 1. Light diffused by the light control member 6 is inputted to the light control member 7 and gathered around a direction of normal with respect to the emission face 5 regarding in a plane approximately in Y-direction, then being outputted toward the third light control member 8.

The second light control member 8 is also a so-called prism sheet. The light control member 8 includes a PET sheet as a base material having an upper face on which a great number of prism cuts 26 having a cross section shaped like triangles are formed repeatedly. Each of the prism cuts 26 extends approximately in Y-direction shown in FIG. 1. That is, this extending direction is generally vertical to an extending direction of each prism cut 25.

The second light control member 8 has a function of modifying a propagation direction of light regarding in a plane approximate in X-direction shown in FIG. 1. Light outputted from the light control member 7 is inputted to the light control member 8 and gathered around a direction of normal with respect to the emission face 5 regarding in a plane approximately in X-direction, then being outputted toward the forth light control member 9.

The forth light control member 9 is a protection sheet provided with a light diffusing function. The light control member 9 has a function of preventing the prism cuts 26 of the light control member 8 from being damaged and diffuses moderately the light which is gathered around a direction of normal with respect to the light guide plate 2 by means of the light control members 7 and 8. This relaxes sharpness of gathering characteristics of the output light of the light control member 9 (i.e. illumination light for the LCD panel 11), thereby expanding a viewing angle of the LCD panel 11.

Reflection Sheet

The reflection sheet 13 is a sheet-like member made of a resin material superior in light reflectivity (for example, white PET). The reflection sheet 13 has a shape like rectangle corresponding to the back face 12 of the light guide plate 2. A main function of the reflection sheet 13 is to reflect and return light, which leaks from the back face 12, into the light guide plate 2 for avoiding loss of light.

Reflection Face of Casing

The reflection face 14 of a casing is arranged along a back face 12 if the above reflection sheet 13 is not employed. The reflection face 14 is made of injection-molded white resin, having a function of reflect and return light, which leaks from the back face 12, into the light guide plate 2, the injection-molded resin may be PC, ABS resin or PMMA or the like in which a white pigment is added and kneaded together.

Operation and Effects of the Instant Embodiment

In the LCD 1 of the instant embodiment the first light diffusion pattern 17 is formed on the back face 12 of the light guide plate 2 as to tend to get denser according to an increasing distance from the LED 4 while the second light diffusion pattern 19 is formed on the emission face 5, as described above. And the second light diffusion pattern 19 is formed as to have a higher covering rate in the approximately center portion S5 as compared with in the rest portion and as to be equal to about 89% of the covering rate in the first light diffusion pattern 17 in the approximately center portion of the back face 12.

This enables the approximately center portion S5 of the emission face 5 to show an emission brightness which is increased as much as 20% as compared with that shown in the case of the first reference. This means that an approximately center portion of the LCD panel 11 is able to be illuminated by a high-brightness light. Therefore an image displayed at generally in the center portion is emphasized and allows to be observed easily in devices such as digital still cameras or digital video cameras which employ image-screen-center-portion focusing.

Further to this, according to the instant embodiment, the second light diffusion pattern 19 formed on the emission face 5 consists of light diffusion elements each of which is smaller than each of light diffusion elements which the first light diffusion pattern 17, formed on the back face 12, consists of, with the result that a relaxed feeling of glaring is provided.

Still further, according to the instant embodiment, the second light diffusion pattern 19 formed on the emission face 5 functions as to enforce a light diffusion effect of the first light diffusion pattern 17 formed on the back face 12. Thus light emission from the approximately center portion of the emission face 5 is promoted.

This enables the approximately center portion of the emission face 5 to show a high emission brightness even in a case where the back face 12 functioning as a reflection face does not receive a plenty of light from the LED 4. For example, it is possible to give a light guide plate, which is thick and hardly allows a light emission adjustment or has a complicated shape, desirable emission characteristics.

ess Light

It should be noted that the instant embodiment allows to be modified as follows.

(a) The light guide plate 2 may have a wedge-angle $\theta$ other than about 4 degrees. In general, wedge-angle $\theta$ is preferably not smaller than 2 degrees. However, the present invention is applicable even if wedge-angle $\theta$ is 0 degree.

Figure 11:
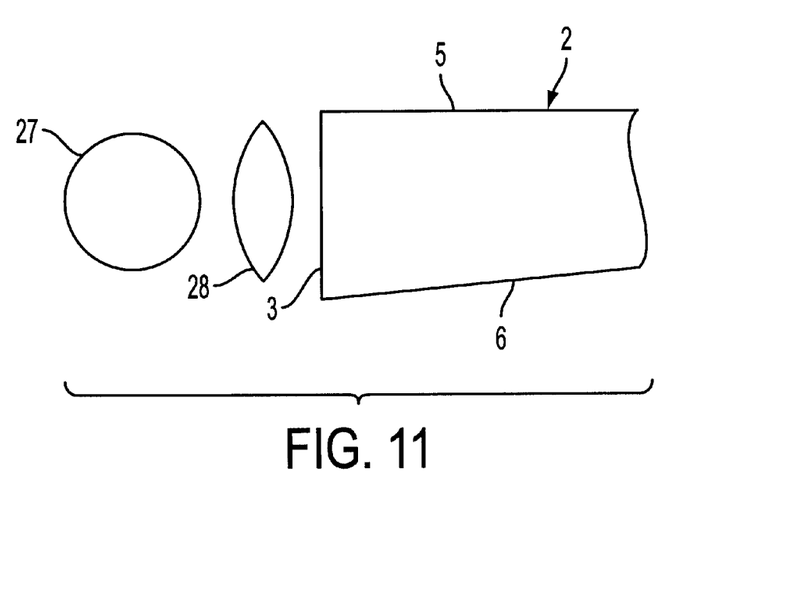
FIG. 11 illustrates a light source which may be employed instead of a LED light source employed in the first embodiment.

(b) Employment of the LED 4 that has an emission directivity regarding in a direction of thickness of the light guide plate 2 is merely an example. For example, a lens 28 may be interposed between a fluorescent lamp 27 and an incidence face 3 for focusing light from the fluorescent lamp 27 to make incident the light to the incidence face 3.

(c) Employment of the LED 4 that has an angular-half-width φ 1 of 60 degrees is also merely an example. In general, the LED 4 preferably has an angular-half-width φ 1 that is modified depending on size of the emission face 5, thickness or wedge-angle of the light guide plate 2.

(d) In the above-described structure, the first light diffusion pattern 17 consists of light diffusion elements each of which is 0.1 mm in side length and the second light diffusion pattern 19 consists of light diffusion elements each of which is 0.05 mm in side length. This is aso merely an example. In general, unless a feeling of glaring arises, these sizes may be modified depending on design conditions such as size of the emission face 5.

(e) Covering rate of the second light diffusion pattern 19 may have a peak at a location modified with respect to that adopted in the above-described embodiment. Peak location may be shifted as to be closer to the LED 4 or more distant from the LED 4.

(f) The surface light source device 15 may be applied to uses other than lighting of the LCD panel 11. For example, it may be applied to various uses such as lighting of a light permeable panel carrying an image for advertising or other panel-like objects.

(g) The first through forth light control members 6 to 9 disposed along the emission face 5 of the light guide plate 2 merely give an example of set. For example, only the first light control member 6 may be disposed along the emission face 5.

(h) The above-described light diffusion patterns 17 and 19 are also merely examples. They may consist of printed light diffusion substance like dots.

(i) In the above-described structure, the light diffusion patterns 17, 19 are formed in the effective emission area on the emission face 5. This is also an example and, for example, the whole of both the emission face 5 and back face 12 may be covered by light diffusion patterns.

Second Embodiment

Figure 12:
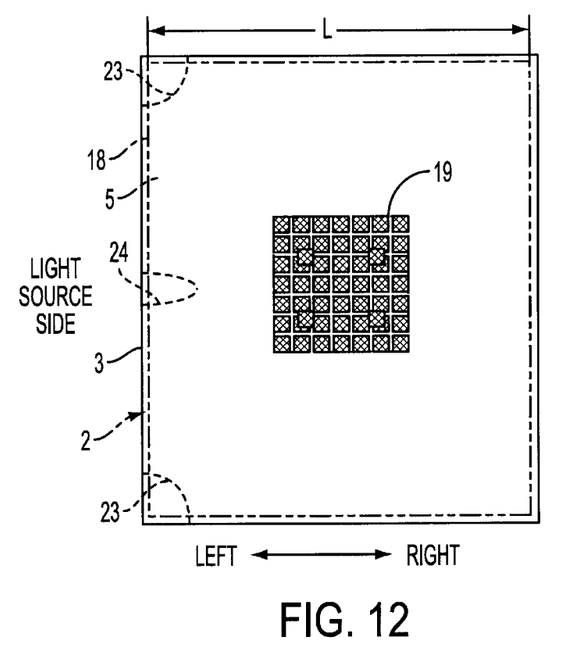
FIG. 12 is a plan view illustrating an emission face of a light guide plate employed in a second embodiment in accordance with the present invention.

FIG. 12 illustrates an emission face 5 of a light guide plate 2 employed in the second embodiment in accordance with the present invention. As shown in FIG. 12, the second light diffusion pattern 19 is formed only in an approximately center portion of the emission face 5.

This brings a clearer appearing emission brightness difference between the approximately center portion of the emission face 5 and the rest portion.

Third Embodiment

Figure 13:
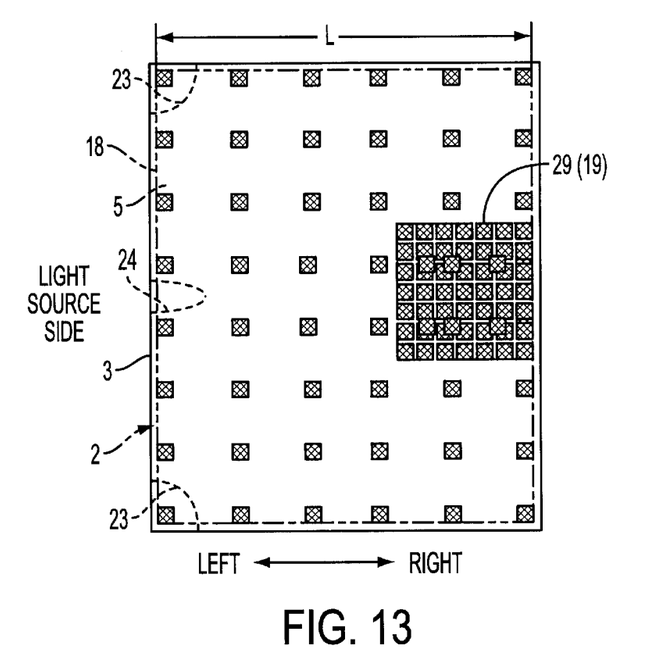
FIG. 13 is a plan view illustrating an emission face of a light guide plate employed in a third embodiment in accordance with the present invention.

FIG. 13 illustrates an emission face 5 of a light guide plate 2 employed in the third embodiment in accordance with the present invention.

As shown in FIG. 13, one or more second light diffusion patterns 19 are formed in one or more particular partial regions 29. This enables each of these particular regions to have a heightened emission brightness as compared with the rest region. The LCD panel displays an brighter image, corresponding to each of the particular regions, as compared with the rest area.

This embodiment is suitable for cases where a LCD panel is divided into a plurality of screen areas which provide digital images differently from each other. If the instant embodiment is applied to the cases, each of the divided screen areas are illuminated by highly bright light, bringing images easy to observe.

Forth Embodiment

Figure 14:
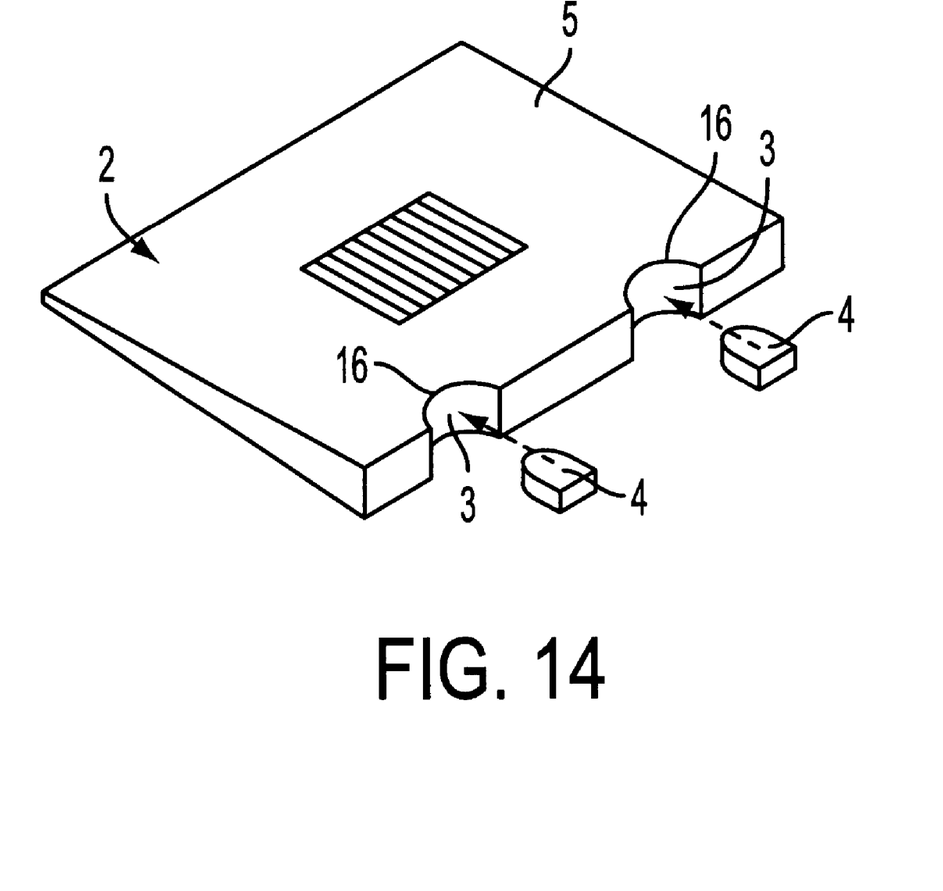
FIG. 14 is a perspective view illustrating an emission face of a light guide plate employed in a forth embodiment in accordance with the present invention.

FIG. 14 illustrates a light guide plate 2 employed in the forth embodiment in accordance with the present invention.

As shown in FIG. 14, the light guide plate 2 has LED accommodation portions 16 like semi-circles for accommodate LEDs at a predetermined interval on a thicker side of the light guide plate 2 (the left end side in FIG. 2).

And semi-circular sides faces of the LED accommodation portions 16 face LEDs 4, respectively. The sides function as incidence faces for introducing light into the light guide plate 2.

As described above in detail, the present invention provides a light guide plate having an emission face provided with emission brightness characteristics such that a particular partial region(s), typically an approximately center portion, shows an intentionally heightened emission brightness.

Accordingly, if the light guide plate is employed in a surface light source device, the surface light source device can has an approximately center portion showing an intentionally heightened emission brightness. Further to this, if the surface light source device is applied to an lighting arrangement for an image display unit, one or more particular regions, such as approximately center portion, of the image display unit can provide an image display with an emphasized brightness.

Such an emphasis display technique is suitably applied to devices such as digital still cameras or digital video cameras which employ image-screen-center-portion focusing.

What is claimed is:

1. A surface light source device comprising:
   a light guide plate, having a first major face serving as an emission face and a second major face serving as a back face opposite to said the emission face, and having end portion; and
   a primary light source disposed in the vicinity of the end portion of said light guide plate, said primary light source supplying light to said light guide plate to be emitted from said emission face,
   wherein
   a first light diffusion pattern is formed on said back face, said first light diffusion pattern having light diffusion elements distributed with a density which increases with increasing distance from said primary light source,
   a particular partial region and a surrounding region, around said particular partial region, are defined in said emission face, and
   a second light diffusion pattern is formed in said particular partial region so that said particular partial region provides a higher emission brightness as compared with that provided by the surrounding region.

2. A surface light source device in accordance with claim 1, wherein said particular partial region is located approximately at a center of said emission face.

3. A surface light source device in accordance with claim 1, wherein said second light diffusion pattern is also formed at least in a part of said surrounding region.

4. A surface light source device in accordance with claim 3, wherein said second light diffusion pattern has light diffusion elements which are distributed more densely in said particular partial region as compared with in said surrounding region.

5. A surface light source device in accordance with claim 4, wherein said second light diffusion pattern has light diffusion elements each of which is smaller than each of light diffusion elements of said first light diffusion pattern.

6. A surface light source device in accordance with claim 3, wherein said second light diffusion pattern has light diffusion elements each of which is smaller than each of light diffusion elements of said first light diffusion pattern.

7. A surface light source device in accordance with claim 3, wherein said light guide plate has a wedge-like cross section so that thickness gets smaller according to an increasing distance from said primary light source.

8. A surface light source device in accordance with claim 1, wherein said second light diffusion pattern has light diffusion elements each of which is smaller than each of light diffusion elements of said first light diffusion pattern.

9. A surface light source device in accordance with claim 1, wherein said light guide plate has a wedge-like cross section so that thickness gets smaller according to an increasing distance from said primary light source.

10. A display comprising:
   a surface light source device and which includes:
      a light guide plate, having a first major face serving as an emission face and a second major face serving as a back face opposite to said the emission face, and having end portion; and
      a primary light source disposed in the vicinity of the end portion of said light guide plate, said primary light source supplying light to said light guide plate to be emitted from said emission face,
   wherein
      a first light diffusion pattern is formed on said back face, said first light diffusion pattern having light diffusion elements distributed with a density which increases with increasing distance from said primary light source,
      a particular partial region and a surrounding region, around said particular partial region, are defined in said emission face, and
      a second light diffusion pattern is formed in said particular partial region so that said particular partial region provides a higher emission brightness as compared with that provided by the surrounding region; and
   an image display unit supplied with illumination light from said surface light source device.

11. A display in accordance with claim 10, wherein said particular partial region is located approximately at a center of said emission face.

12. A display in accordance with claim 10, wherein said second light diffusion pattern is also formed at least in a part of said surrounding region.

13. A display in accordance with claim 12, wherein said second light diffusion pattern has light diffusion elements which are distributed more densely said particular partial region as compared with in said surrounding region.

14. A display in accordance with claim 13, wherein said second light diffusion pattern has light diffusion elements each of which is smaller than each of light diffusion elements of said first light diffusion pattern.

15. A display in accordance with claim 12, wherein said second light diffusion pattern has light diffusion elements each of which is smaller than each of light diffusion elements of said first light diffusion pattern.

16. A display in accordance with claim 12, wherein said light guide plate has a wedge-like cross section so that thickness gets smaller according to an increasing distance from said primary light source.

17. A display in accordance with claim 10, wherein said second light diffusion pattern has light diffusion elements each of which is smaller than each of light diffusion elements of said first light diffusion pattern.

18. A display in accordance with claim 10, wherein said light guide plate has a wedge-like cross section so that thickness gets smaller according to an increasing distance from said primary light source.

19. A light guide plate having a first major face serving as an emission face and a second major face serving as a back face opposite to said the emission face and an incidence face through which light is introduced to be emitted from said emission face,
   wherein
      a first light diffusion pattern is formed on said back face, said first light diffusion pattern having light diffusion elements distributed with a density which increases with increasing distance from said incidence face,
      a particular partial region and a surrounding region, around said particular partial region, are defined in said emission face, and
      a second light diffusion pattern is formed in said particular partial region so that said particular partial region provides a higher emission brightness as compared with Ser. No. 10/060,214 that provided by the surrounding region.

20. A light guide plate in accordance with claim 19, wherein said particular partial region is located approximately at a center of said emission face.

21. A light guide plate in accordance with claim 19, wherein said second light diffusion pattern is also formed at least in a part of said surrounding region.

22. A light guide plate in accordance with claim 21, wherein said second light diffusion pattern has light diffusion elements which are distributed more densely in said particular partial region as compared with in said surrounding region.

23. A light guide plate in accordance with claim 22, wherein said second light diffusion pattern has light diffusion elements each of which is smaller than each of light diffusion elements of said first light diffusion pattern.

24. A light guide plate in accordance with claim 21, wherein said second light diffusion pattern has light diffusion elements each of which is smaller than each of light diffusion elements of said first light diffusion pattern.

25. A light guide plate in accordance with claim 21, wherein said light guide plate has a wedge-like cross section 50 that thickness gets smaller according to an increasing distance from said incidence face.

26. A light guide plate in accordance with claim 19, wherein said second light diffusion pattern has light diffusion elements each of which is smaller than each of light diffusion elements of said first light diffusion pattern.

27. A light guide plate in accordance with claim 19, wherein said light guide plate has a wedge-like cross section SO that thickness gets smaller according to an increasing distance from said incidence face.

* * * * *

UNITED STATES PATENT AND TRADEMARK OFFICE
CERTIFICATE OF CORRECTION

PATENT NO.    : 6,612,710 B2
DATED         : September 2, 2003
INVENTOR(S)   : Kazuo Suzuki et al.

It is certified that error appears in the above-identified patent and that said Letters Patent is hereby corrected as shown below:

Column 6,
Line 23, after "18" start a new paragraph with "A light diffusion ..."

Column 14,
Line 26, delete "Ser. No. 10/060,214"
Line 49, change "50" to -- so --
Line 57, change "SO" to -- so --

Signed and Sealed this

Second Day of March, 2004

JON W. DUDAS
*Acting Director of the United States Patent and Trademark Office*